US012136309B2

(12) United States Patent
Um

(10) Patent No.: US 12,136,309 B2
(45) Date of Patent: Nov. 5, 2024

(54) DEPOSIT MACHINE HAVING CASSETTE WITH IMPROVED USABILITY

(71) Applicant: HANMEGA CO., LTD., Seoul (KR)

(72) Inventor: Tae Sung Um, Seoul (KR)

(73) Assignee: HANMEGA CO., LTD., Seoul (KR)

( * ) Notice: Subject to any disclaimer, the term of this patent is extended or adjusted under 35 U.S.C. 154(b) by 167 days.

(21) Appl. No.: 17/970,625

(22) Filed: Oct. 21, 2022

(65) Prior Publication Data

US 2024/0021038 A1 Jan. 18, 2024

(30) Foreign Application Priority Data

Jul. 14, 2022 (KR) ........................ 10-2022-0087190

(51) Int. Cl.

| | |
|---|---|
| ***G07D 11/125*** | (2019.01) |
| ***G07D 11/237*** | (2019.01) |
| ***G07D 11/40*** | (2019.01) |
| *G07D 7/04* | (2016.01) |
| *G07D 7/12* | (2016.01) |

(52) U.S. Cl.

CPC ......... *G07D 11/125* (2019.01); *G07D 11/237* (2019.01); *G07D 11/40* (2019.01); *B65H 2402/45* (2013.01); *B65H 2701/1912* (2013.01); *G07D 7/04* (2013.01); *G07D 7/12* (2013.01); *G07D 2207/00* (2013.01); *G07D 2211/00* (2013.01)

(58) Field of Classification Search

CPC .. G07D 11/125; G07D 11/13; G07D 2211/00; G07D 2207/00; G07D 7/04; G07D 11/40; G07D 11/237; B65H 2701/1912

See application file for complete search history.

(56) References Cited

U.S. PATENT DOCUMENTS

| | | | | |
|---|---|---|---|---|
| 4,711,441 A * | 12/1987 | Taylor | B65H 7/00 | 271/259 |
| 6,325,242 B1 | 12/2001 | Izawa et al. | | |
| 7,789,214 B2 | 9/2010 | Bergeron et al. | | |
| 8,109,509 B2 * | 2/2012 | Nireki | B65H 31/22 | 271/264 |
| 8,146,914 B2 | 4/2012 | Cost | | |
| 8,550,453 B2 | 10/2013 | Cost | | |
| 2010/0052237 A1 * | 3/2010 | Herczeg | G07F 19/20 | 271/3.16 |

* cited by examiner

*Primary Examiner* — Jeremy R Severson

(74) *Attorney, Agent, or Firm* — H&I PARTNERS; Chai Im; C. Andrew Im

(57) ABSTRACT

A deposit machine having a cassette with improved usability. The deposit machine includes a body and a header housing integrally fixed to one side of the body and having an infrared ray (IR) sensor and a magnetoresistance (MR) sensor mounted thereon. The IR and MR sensors detect whether banknotes are counterfeit banknotes and whether the banknotes are accommodated. A header cover openably and closably fixed to the header housing by a hinge to allow top of the header housing to be open. The cassette mounted inside the body accommodates banknotes supplied from the header housing.

6 Claims, 13 Drawing Sheets

Enlarged view of a portion A of FIG. 12

DEPOSIT MACHINE HAVING CASSETTE WITH IMPROVED USABILITY

CROSS REFERENCE TO RELATED APPLICATION OF THE INVENTION

The present application claims the benefit of Korean Patent Application No. 10-2022-0087190 filed in the Korean Intellectual Property Office on Jul. 14, 2022, the entire contents of which are incorporated herein by reference.

FIELD OF THE INVENTION

The present invention relates to a deposit machine having a cassette with improved usability, and more specifically, to a deposit machine having a cassette with improved usability that is capable of allowing a header to be rotatable by means of a hinge, thereby providing easy maintenance, having the cassette that handles 2,000 or more pieces of banknotes and is improved in configuration, thereby easily checking a banknote stack and internal state of the cassette, and providing an image scanning function, thereby improving counterfeit banknote detection capability thereof.

BACKGROUND OF THE RELATED ART

Generally, a deposit machine is a device that checks whether banknotes such as cash are genuine or not and receive the banknotes according to the checking results, so as to unmannedly provide for a user all kinds of services related to financial services excepting counseling, conveniently and quickly, at his or her desired time.

The deposit machine may be combined with an automatic cash deposit and withdrawal machine, but mostly, the deposit machine is used to allow a user to deposit cash thereinto so as to buy chips at a facility such as a casino and the like.

In specific, the deposit machine related to the present invention is useful in recognizing and receiving United States dollars, but without being limited thereto, of course, the deposit machine may be configured to recognize cash (hereinafter, referred to as 'banknotes') available according to places used.

The deposit machine includes a header having an insertion hole adapted to insert banknotes, a body to which the header is fixed, and a cassette detachably coupled to the body to stackingly accommodate the banknotes inserted from the header.

In this case, the header is completely detachable from the body, and accordingly, if it is necessary to repair the header or to change the kinds of banknotes, the header is separated from the body and then exchanged with another kind of header.

As a result, the deposit machine can handle various kinds of banknotes and remove a banknote jam, but does not have any additional advantages, which makes the detachable configuration of the header become inefficient.

In the case where only one kind of banknote is used, further, it is not necessary to have such a detachable configuration, it is inconvenient to use the detachable configuration, and the detachable configuration causes a manufacturing cost to be raised.

So as to check whether banknotes are genuine or not, in addition, the conventional deposit machine makes use of an infrared ray (IR) sensor for reading anti-counterfeiting points as waveforms and a magnetoresistance (MR) sensor for reading information of a specific position as a magnetoresistance effect. However, it is necessary to have another sensor or device capable of detecting counterfeit banknotes that become more sophisticated, and further, it is necessary to improve a processing speed of the deposit machine.

In the case of a small capacity cassette, moreover, a cassette door is configured to open on a hinge, but in the case of a large capacity cassette handling 2,000 or more pieces of banknotes, which is related to the present invention, if a cassette door is open on a hinge, the banknotes stackingly accommodated in the cassette may be spread out and scattered. Accordingly, the large capacity cassette has a configuration as shown in FIG. 1.

In specific, an opening with a given size is formed on a portion of a cassette body 10, and a sliding door 12 is coupled to the cassette body 10 and slides up and down to open and close the opening.

Under the above configuration, however, the opening is open when the sliding door 12 slides down, and accordingly, banknotes cannot be drawn from the cassette when the cassette stands up. As a result, as shown, the sliding door 12 slides down only when the cassette body 10 lies, thereby causing many inconveniences while being used.

PRIOR ART LITERATURE

U.S. Pat. No. 8,146,914 (Mar. 3, 2012) entitled "Currency cassette pressure plate assembly"
U.S. Pat. No. 8,550,453 (Oct. 8, 2013) entitled "Currency cassette pressure plate assembly"
U.S. Pat. No. 7,789,214 (Sep. 7, 2010) entitled "Stacker mechanisms and cassettes for banknotes and the like"
U.S. Pat. No. 6,325,242 (Dec. 4, 2001) entitled "Note holding and dispensing device with cassette"

SUMMARY OF THE INVENTION

Accordingly, the present invention has been made in view of the above-mentioned problems occurring in the related art, and it is an object of the present invention to provide a deposit machine having a cassette with improved usability that is capable of allowing a header to be rotatable by means of a hinge, thereby providing easy maintenance, having the cassette that handles 2,000 or more pieces of banknotes and is improved in configuration, thereby easily checking a banknote stack and internal state of the cassette, and providing an image scanning function, thereby improving counterfeit banknote detection capability thereof.

To accomplish the above-mentioned objects, according to the present invention, there is provided a deposit machine having a cassette with improved usability, including: a body; a header housing integrally fixed to one side of the body and having an infrared ray (IR) sensor and a magnetoresistance (MR) sensor mounted thereon to detect whether banknotes are counterfeit banknotes and determine whether the banknotes are accommodated; a header cover openably and closably fixed to the header housing by means of a hinge to allow top of the header housing to be open; and the cassette mounted inside the body to accommodate banknotes supplied from the header housing.

According to the present invention, desirably, the header housing may include a contact image sensor (CIS) mounted thereon and a stepping motor as a driving source for transferring the banknotes inserted thereinto.

According to the present invention, desirably, the cassette may include: a rectangular box-shaped cassette housing having a space in which the banknotes are accommodated; a handle fixed to top of the cassette housing; banknote transfer gears disposed on one end portion of one longitudinal side thereof in a direction perpendicular to the handle; a lower plate fixed to the opposite side to the surface on which the banknote transfer gears are disposed; and a cassette door fixed to the top end of the lower plate by means of a hinge to open and close an open portion formed on the cassette housing.

According to the present invention, desirably, the cassette housing may include at least one or more checking members, and the checking members may include a pair of first checking members formed of prisms for radiating light and receiving the radiated light to detect whether a banknote jam occurs, a pair of second checking members formed of prisms for radiating light and repeatedly receiving or cutting off the radiated light to detect whether the banknote transfer gears are malfunctioned, and a pair of third checking members formed of prisms for radiating light and receiving the radiated light to detect whether the cassette is mounted on or demounted from the body.

According to the present invention, desirably, the cassette door may include: a door sliding plate spaced apart from the inner surface thereof and slidingly moving up and down; sliding limitation slots formed on the door sliding plate to limit the moving distance of the door sliding plate; and sliding plate restriction members fitted to the sliding limitation slots and fixed thereto.

According to the present invention, desirably, the lower plate may include: a lower sliding plate spaced apart from the inner surface thereof and slidingly moving up and down; sliding limitation slots formed on the lower sliding plate to limit the moving distance of the lower sliding plate; and sliding plate restriction members fitted to the sliding limitation slots and fixed thereto.

According to the present invention, desirably, the lower sliding plate and the door sliding plate may be connected to each other by means of a link member so that the lower sliding plate and the door sliding plate may move together and be foldable to each other.

According to the present invention, desirably, the link member may include: a pair of link bars disposed in parallel with each other; and H-shaped first and second linkers fixed to both ends of the pair of link bars, and the lower end of the door sliding plate may be rotatably fixed to upper ends of the first and second linkers by means of hinges, while the top end of the lower sliding plate is being rotatably fixed to lower ends of the first and second linkers by means of hinges.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Figure 1:
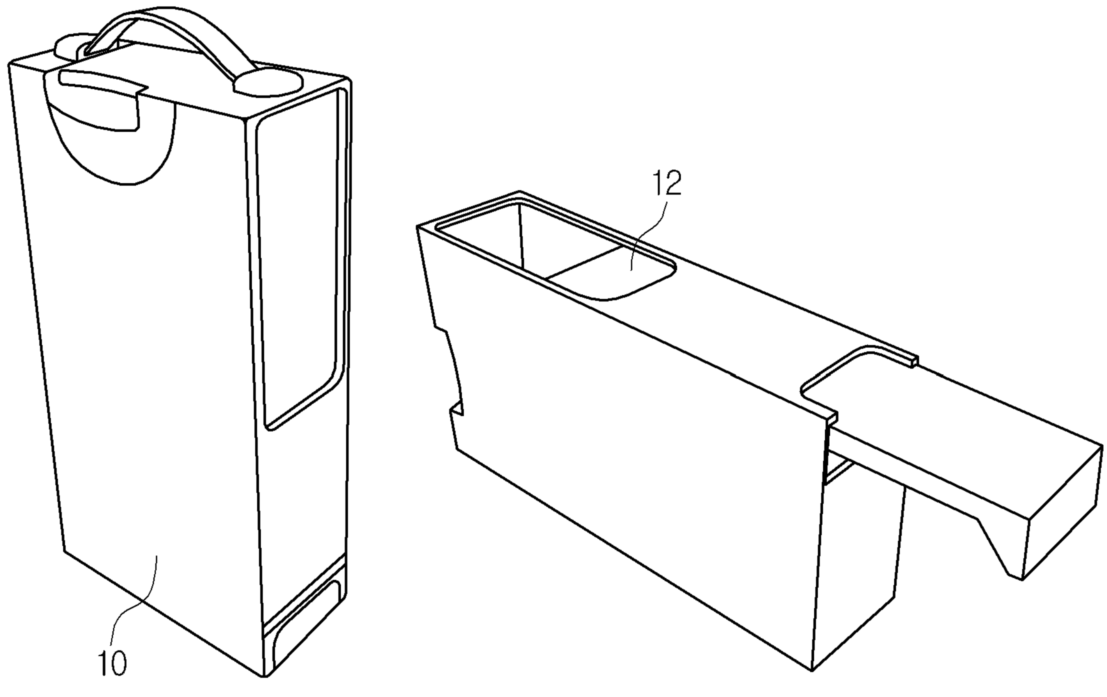
FIG. 1 (PRIOR ART)
FIG. 1 is a photograph showing an example of a conventional cassette.

Hereinafter, an explanation of embodiments of the present invention will be given in detail with reference to the attached drawings.

Before the present invention is disclosed and described, it is to be understood that the disclosed embodiments are merely exemplary of the invention, which can be embodied in various forms. Those skilled in the art will envision many other possible variations within the scope of the present invention.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

Figure 2:
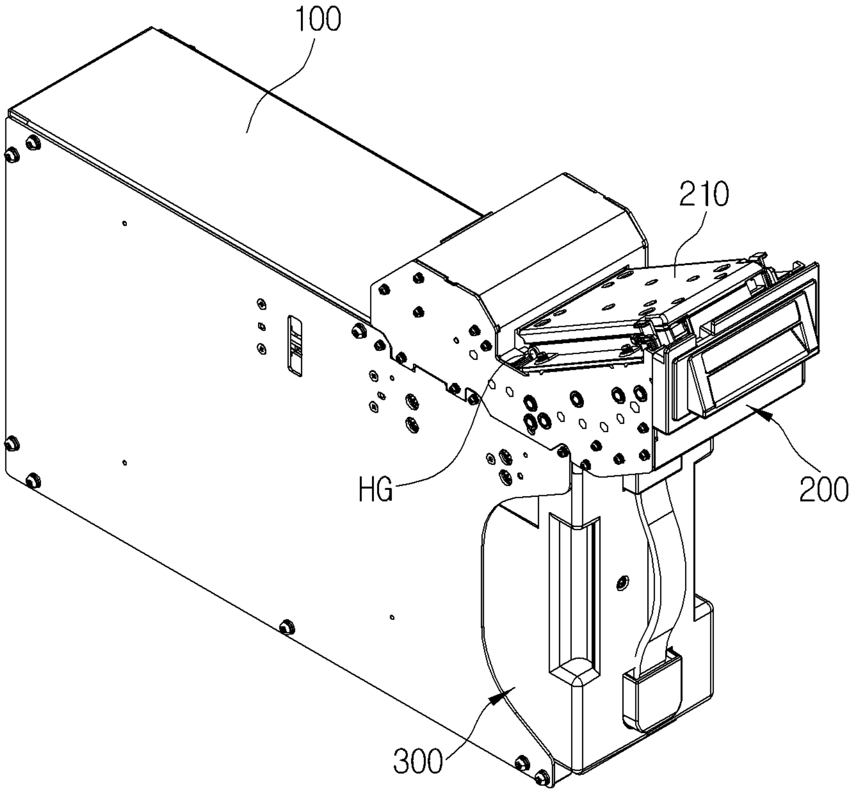
FIG. 2 is a perspective view showing a deposit machine according to the present invention.
Figure 3:
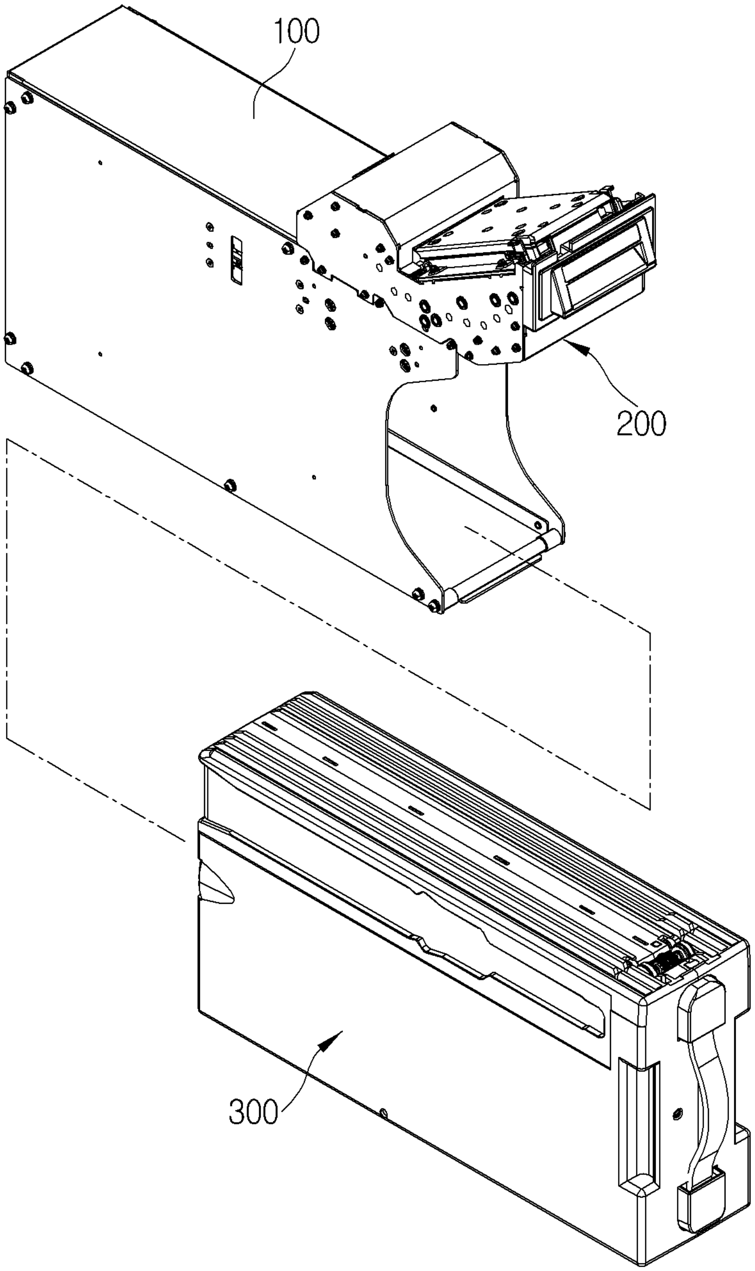
FIG. 3 is an exploded perspective view showing the deposit machine according to the present invention.

As shown in FIGS. 2 and 3, a deposit machine according to the present invention includes a body 100, a header housing 200 integrally fixed to one side of the body 100 to detect whether banknotes are counterfeit banknotes and determine whether the banknotes are accommodated, a header cover 210 openably and closably fixed to the header housing 200 by means of a hinge HG to allow top of the header housing 200 to be open, and a large capacity cassette 300 mounted inside the body 100 to accommodate 2,000 or more pieces of banknotes supplied from the header housing 200.

Figure 4:
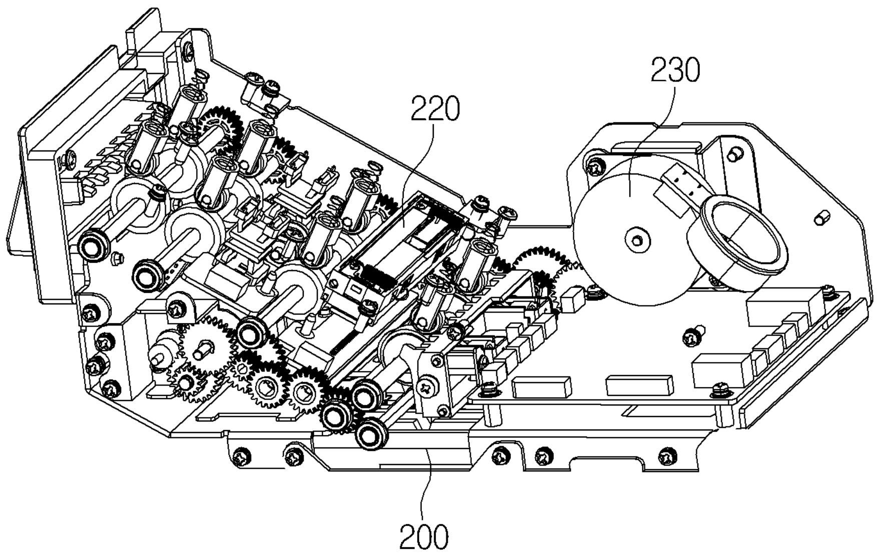
FIG. 4 is a perspective view showing a portion of a header from which a header cover is separated in the deposit machine according to the present invention.

In this case, as shown in FIG. 4 showing the header housing 200 from which the header cover 210 is separated, the header housing 210 includes a contact image sensor (CIS) 220 as well as the existing IR sensor and MR sensor.

The CIS 220 is a scan type image sensor that is used in a flatbed scanner almost in direct contact with the object to be scanned.

The CIS 220 is substantially smaller than a scanner using a charge coupled device (CCD) and uses lower power than the scanner, thereby ensuring efficient operations.

The CIS 220 is the scan type image sensor, but if the banknotes do not move accurately at a uniform speed, scan images may be deformed to cause a recognition rate to become deteriorated.

For this reason, the deposit machine according to the present invention does not adopt a direct current (DC) motor, but adopts a stepping motor 230.

The stepping motor 230 has a rotation angle completely proportional to an input pulse signal, and accordingly, an angle error per one step is small and not accumulated. Further, the stepping motor 230 has good responsibility to motions, stop, and forward and reverse rotations, performs open loop control for the input of pulses such as digital signals, and has a circuit simple in configuration.

As a result, the stepping motor 230 is used as a motor for driving the banknotes so as to improve the recognition rate of the CIS 220 and accurately read the banknotes.

According to the present invention, therefore, the IR and MR detection are performed, and further, the images for genuine banknotes are compared with the scanned images. Accordingly, the deposit machine according to the present invention has a function of distinguishing the genuine banknotes and the counterfeit banknotes with at least triple detection results, thereby remarkably improving counterfeit banknote detection capability.

Further, the cassette 300 is defined as a large capacity accommodation container for stacking 2,000 or more pieces of banknotes.

As shown in FIGS. 5 to 9, the cassette 300 includes a rectangular box-shaped cassette housing 310 having a space in which banknotes are accommodated, a handle 320 fixed to top of the cassette housing 310, banknote transfer gears 330 disposed on one end portion of one longitudinal side thereof in a direction perpendicular to the handle 320, a lower plate 340 fixed to the opposite side to the surface on which the banknote transfer gears 330 are disposed, and a cassette door 360 fixed to the top end of the lower plate 340 by means of a hinge HIN to open and close an open portion 350.

In this case, the cassette door 360 has a longer length than the lower plate 340, so that the banknotes stackingly accommodated in the cassette housing 310 can be easily drawn therethrough.

However, a length of the lower plate 340 has to be greater than ⅓ and less than ½ of a length of the cassette housing 310, thereby providing the open portion 350 through which the banknotes stackingly accommodated in the cassette housing 310 can be safely drawn, without being spread out, when they are drawn from the cassette housing 310.

That is, if a length of the open portion 350 is too long, the banknotes are spread out so that they are scattered, and contrarily, if the length is too short, it is inconvenient to draw the banknotes through the open portion 350. Accordingly, the length of the open portion 350 has to be appropriately determined by means of the length adjustment of the lower plate 340 to the above mentioned range.

Further, the cassette housing 310 has a banknote stacker disposed therein, which is adopted in known deposit machines.

Figure 8:
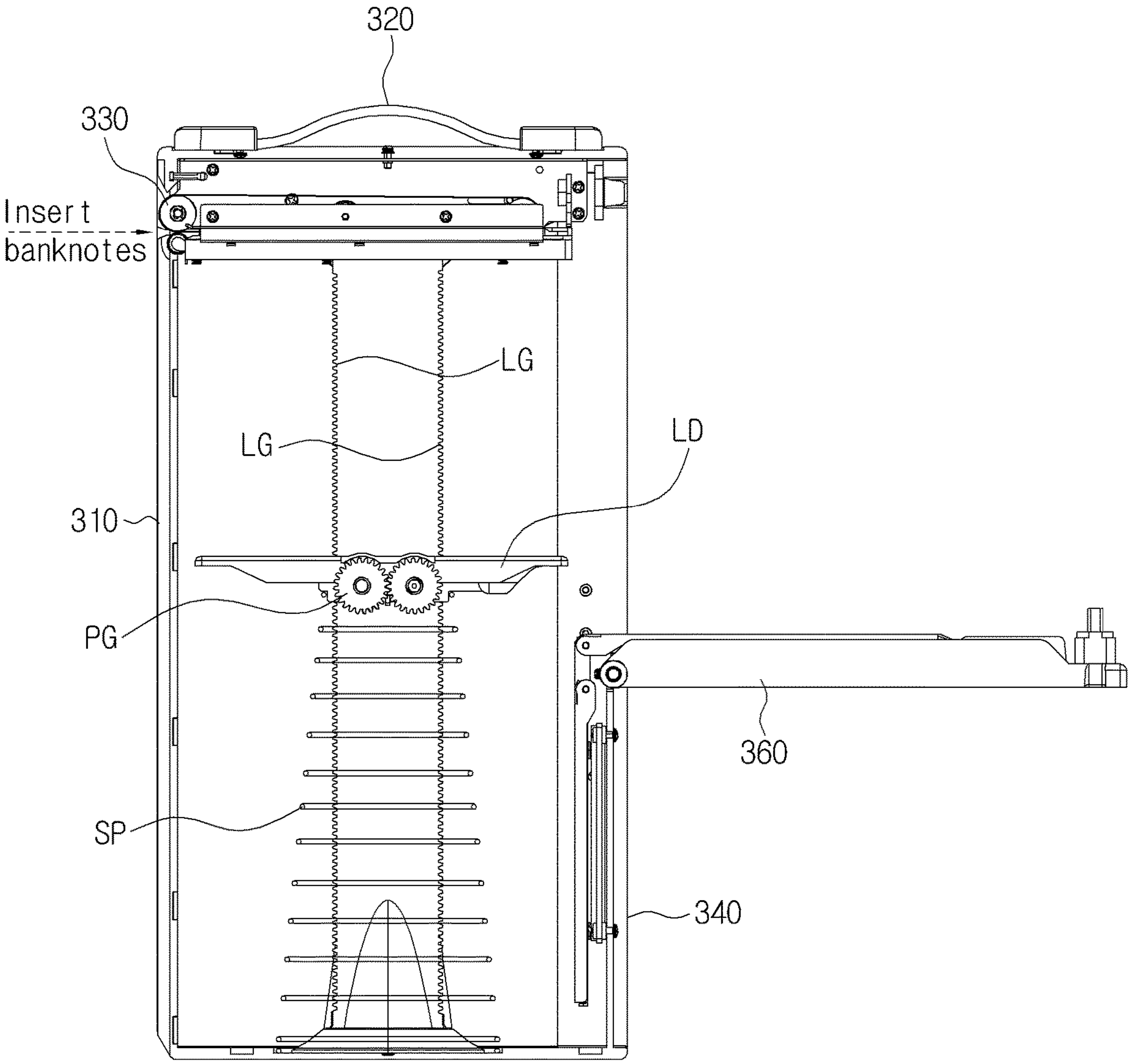
FIG. 8 is a sectional view showing the cassette of FIG. 7.
Figure 9:
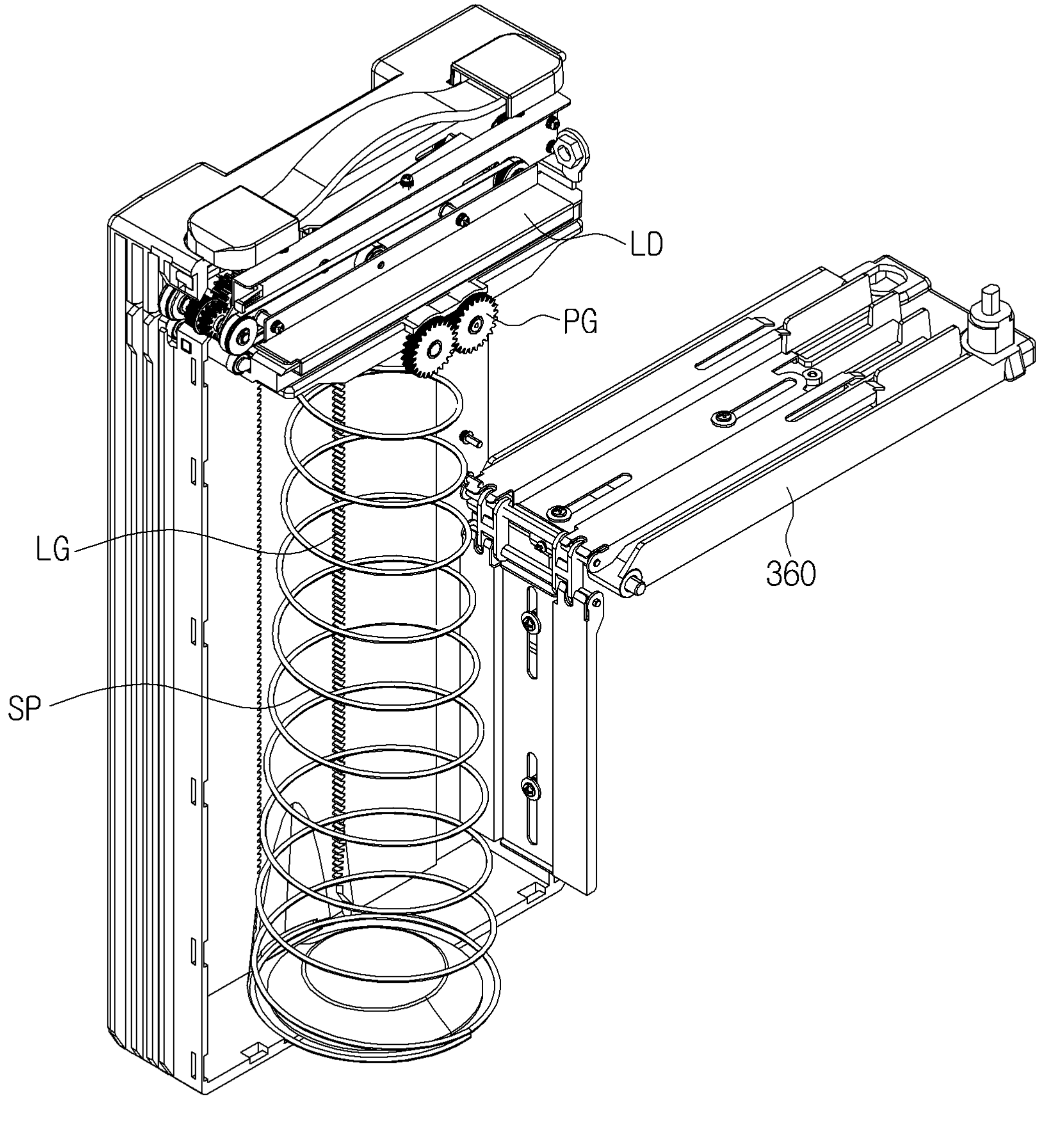
FIG. 9 is a partially cutaway perspective view showing the cassette of FIG. 7.

For example, as shown in FIG. 8, the banknote stacker includes rack gears LG fixed to both inner walls of the cassette housing 310, pinion gears PG movably engaged with the rack gears LG, a loader LD fixed to the pinion gears PG and moving up and down together with the pinion gears PG, and a coil spring SP for providing an elastic restoring force to the loader LD.

In this case, the rack gears LG are disposed on the side surfaces of a pair of fixed plates facing each other, and the pinion gears PG move up and down in a space between the pair of rack gears LG facing each other. Such a configuration is well known in the art, and as the configuration is not included in the characteristics of the present invention, therefore, an explanation of the configuration will be avoided herein.

In specific, the deposit machine according to the present invention further includes at least one or more checking members for immediately checking whether a banknote jam occurs while banknotes are inserted, the banknote transfer gears 330 are malfunctioned, and the cassette 300 is mounted on or demounted from the body 100.

Figure 5:
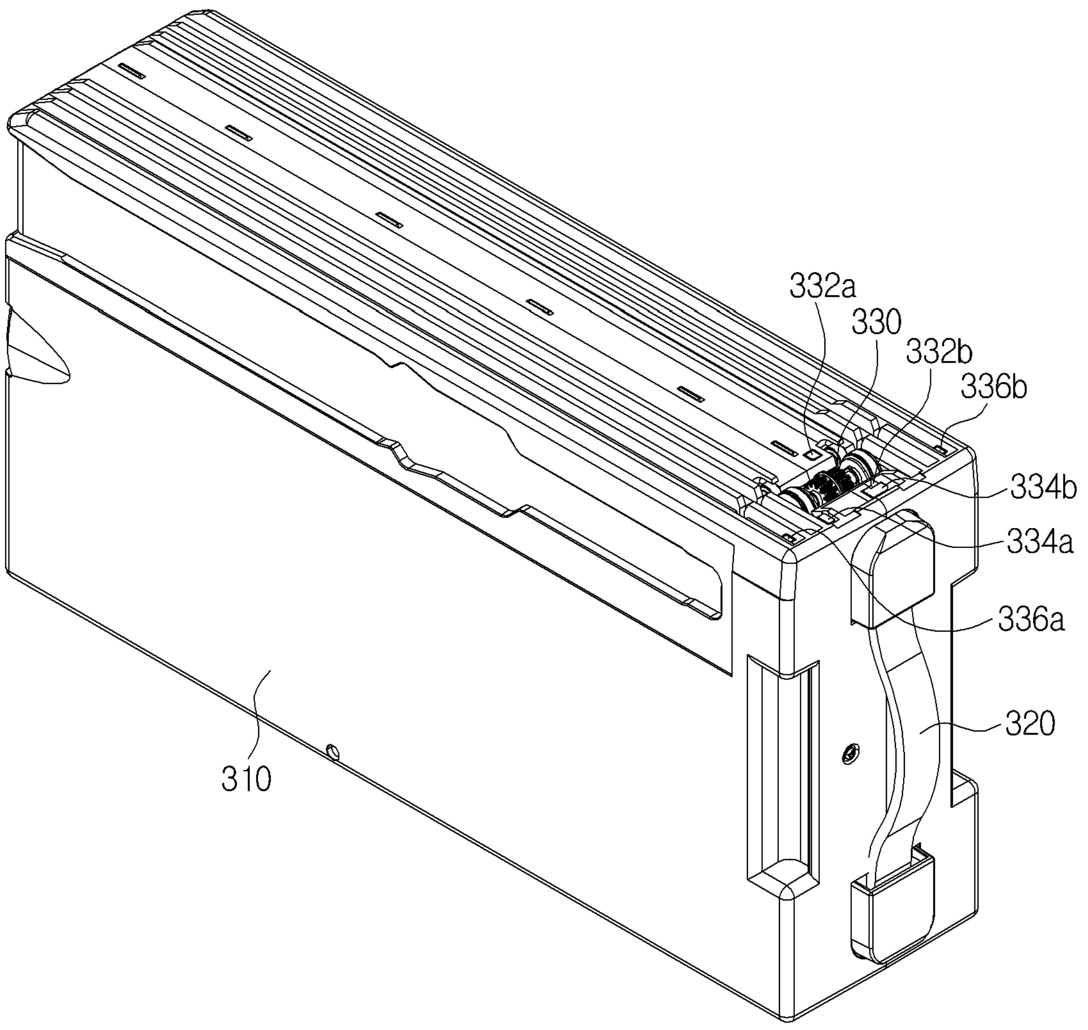
FIG. 5 is a perspective view showing a cassette constituting the deposit machine according to the present invention.
Figure 6:
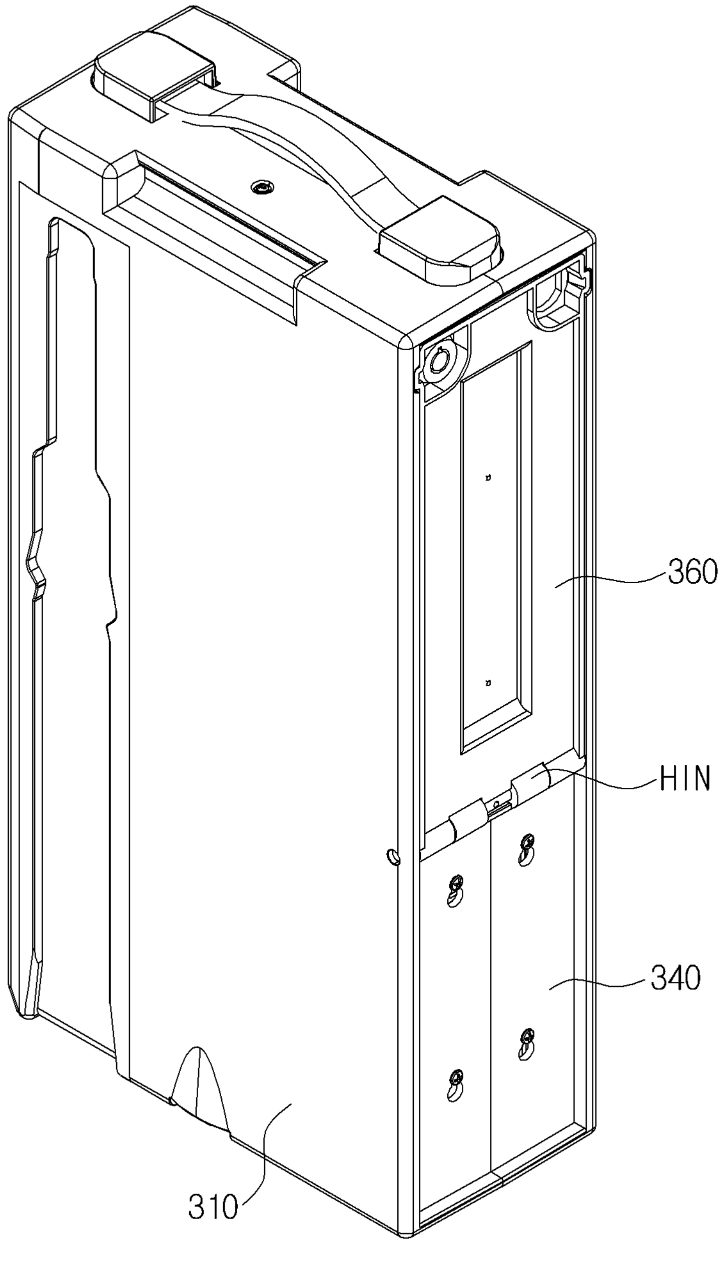
FIG. 6 is a perspective view showing a state where the cassette of FIG. 5 stands up.
Figure 7:
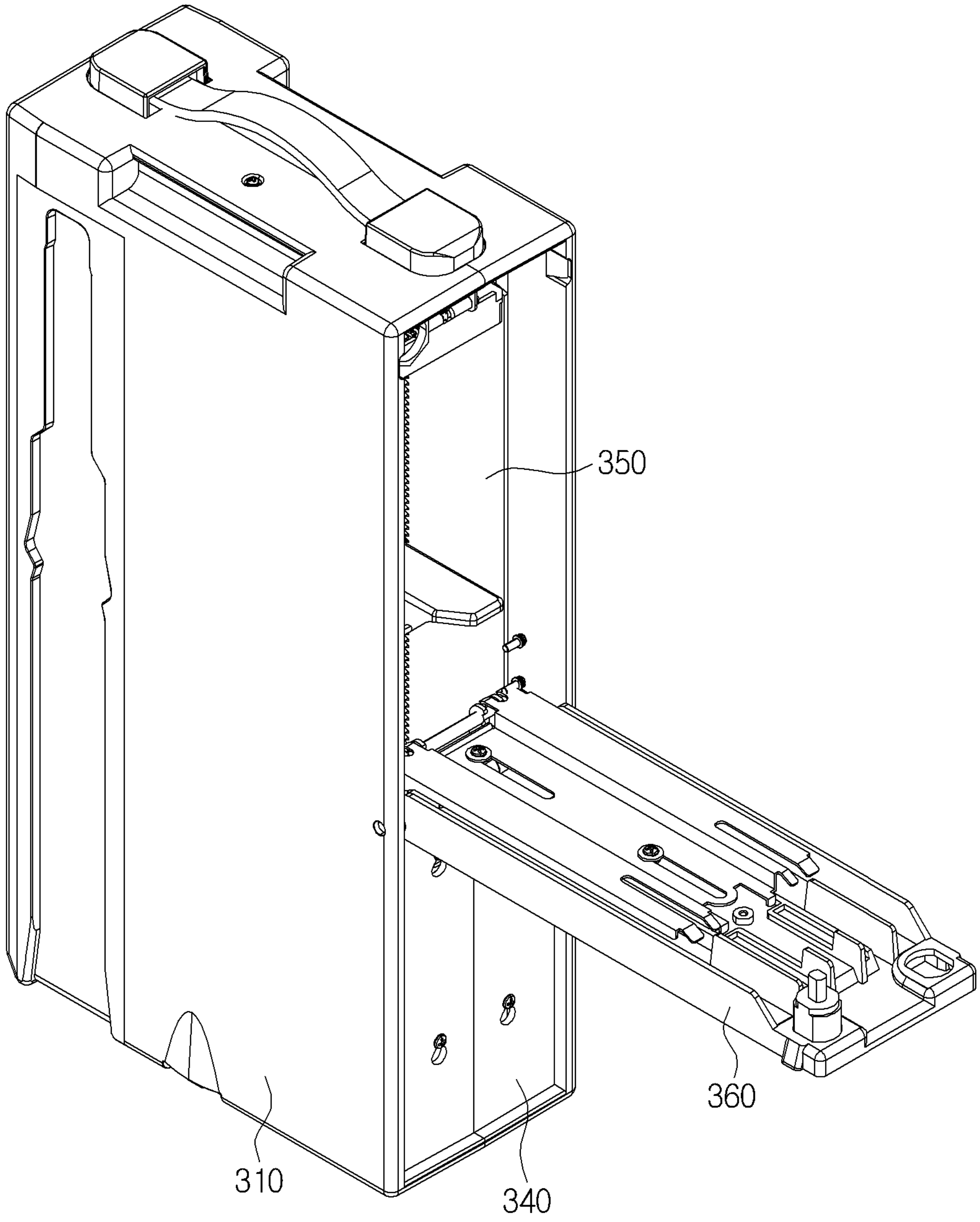
FIG. 7 is a perspective view showing a state where a cassette door of the cassette of FIG. 5 is open.

As shown in FIG. 5, the checking members include a pair of first checking members 332*a* and 332*b* disposed on one longitudinal side of the cassette housing 310, where the banknote transfer gears 330 are disposed, in a longitudinal direction of the cassette housing 310, while placing the banknote transfer gears 330 therebetween, to detect whether a banknote jam occurs.

In this case, the first checking members 332*a* and 332*b* may be formed of prisms, and if a first light emitting source (not shown) disposed on the header 200 is radiated onto any one of the first checking members 332*a* and 332*b* to allow the radiated light to be collected to a first light receiving source (not shown) disposed on the other of the first checking members 332*a* and 332*b*, a normal state is determined. However, if the light is not collected to the first light receiving source, it is determined that a banknote jam occurs, so that an error indication and a warning sound corresponding to the banknote jam are provided.

Further, as shown in FIG. 5, the checking members include a pair of second checking members 334*a* and 334*b* disposed in parallel with the banknote transfer gears 330, while placing a detection plate BL moving one time whenever the banknote transfer gears 330 rotate therebetween, to detect whether the banknote transfer gears 330 are malfunctioned.

In this case, the second checking members 334*a* and 334*b* may be formed of prisms, and if a second light emitting source (not shown) disposed on the header 200 is radiated onto any one of the second checking members 334*a* and 334*b* to allow the radiated light to be repeatedly collected to a second light receiving source (not shown) disposed on the other of the second checking members 334*a* and 334*b*, a normal state is determined. However, if a state where the light is collected or where the light is not collected is maintained, it is determined that the banknote transfer gears 330 are malfunctioned, so that an error indication and a warning sound corresponding to the malfunction are provided.

Figure 10:
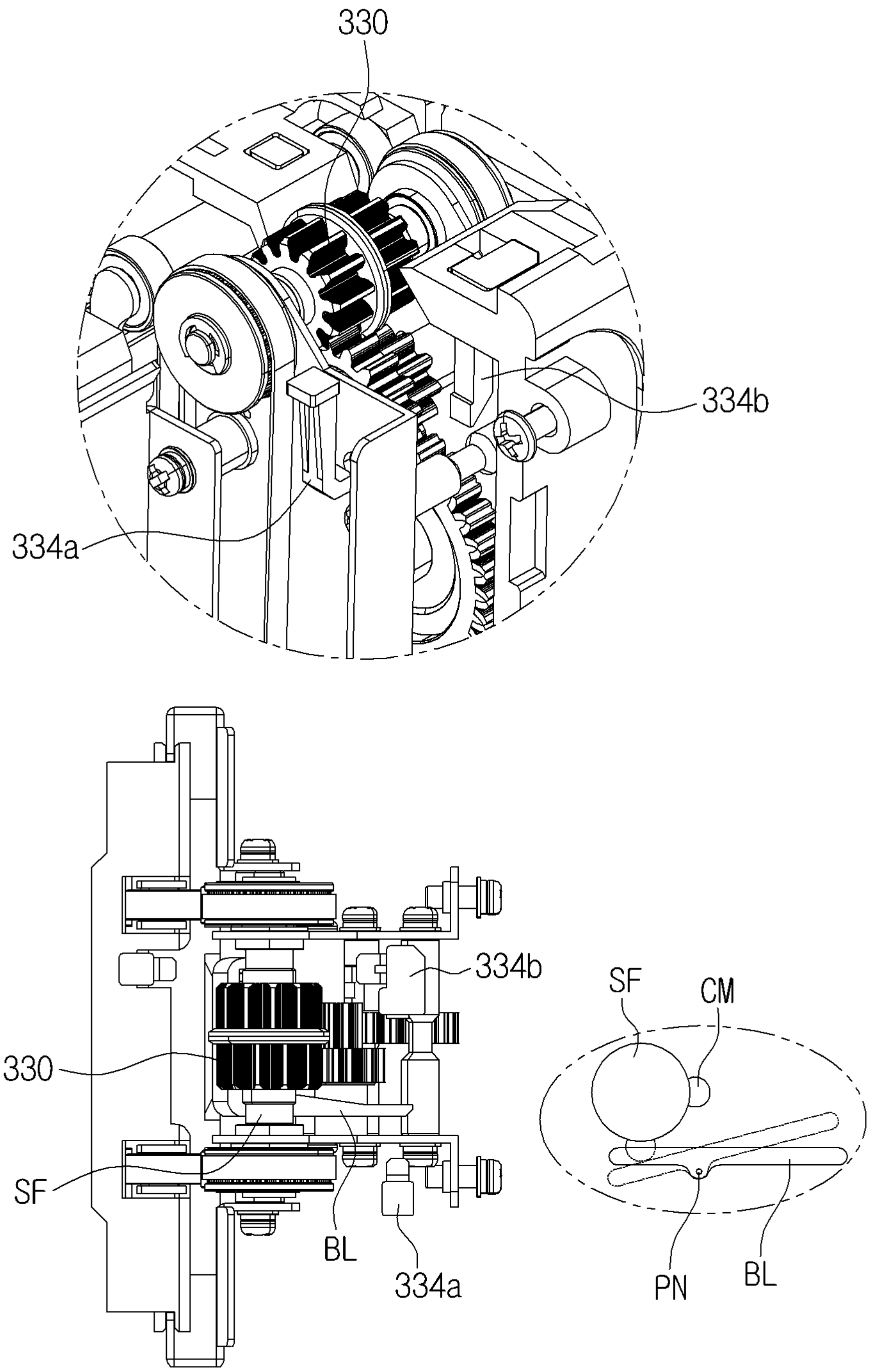
FIG. 10 is an enlarged perspective view showing main parts of the cassette of FIG. 9.

In this case, as shown in FIG. 10, a cam CM is formed on a portion of the outer peripheral surface of a gear shaft SF of the banknote transfer gears 330, and a portion of the detection plate BL is seesawably coupled to the gear shaft SF by means of a shaft pin PN, so that when the gear shaft SF rotates one time, the cam CM definitely presses one end of the detection plate BL one time to allow the other end of the detection plate BL to move up to thus cut off or transmit the light emitted and received through the second checking members 334*a* and 334*b*.

As a result, the malfunctions of the banknote transfer gears 3330 can be easily and conveniently detected.

In addition, as shown in FIG. 5, the checking members include a pair of third checking members 336*a* and 336*b* disposed in parallel with the banknote transfer gears 330 at deeper positions than the installation positions of the second checking members 334*a* and 334*b* on the outsides of the second checking members 334*a* and 334*b*, to detect whether the cassette 300 is mounted on or demounted from the body 100.

In this case, the third checking members 336*a* and 336*b* may be formed of prisms, and if a third light emitting source (not shown) disposed on the header 200 is radiated onto any one of the third checking members 336*a* and 336*b* to allow the radiated light to be collected to a third light receiving source (not shown) disposed on the other of the third checking members 336*a* and 336*b*, it is determined that the cassette 300 is mounted on the body 100. However, if the light is not collected, it is determined that the cassette 300 is demounted from the body 100.

Accordingly, the deposit machine according to the present invention is provided with at least one or more checking members, so that it can be operated and managed more conveniently and stably.

Figure 11:
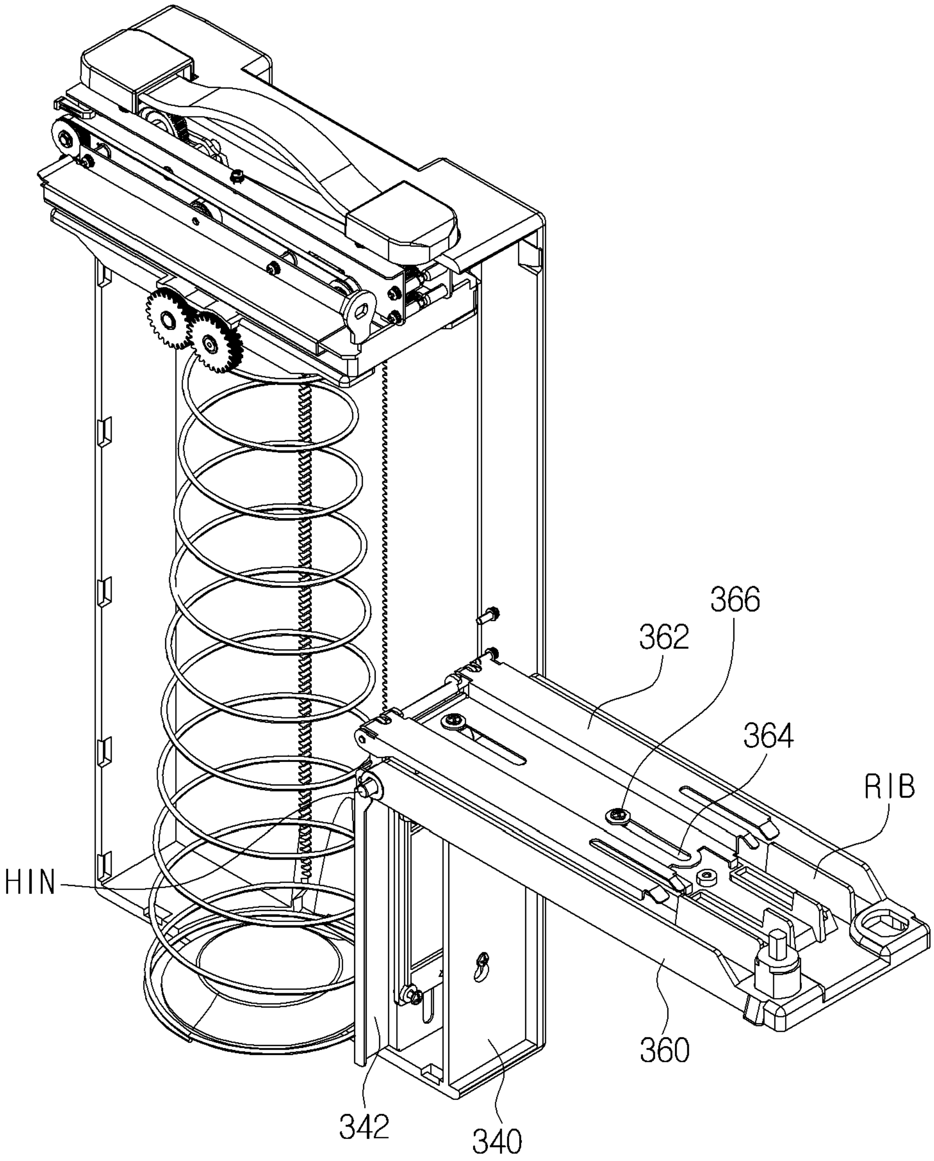
FIG. 11 is a perspective view showing a state where a portion of the cassette is cut away, while the cassette door is open.
Figure 12:
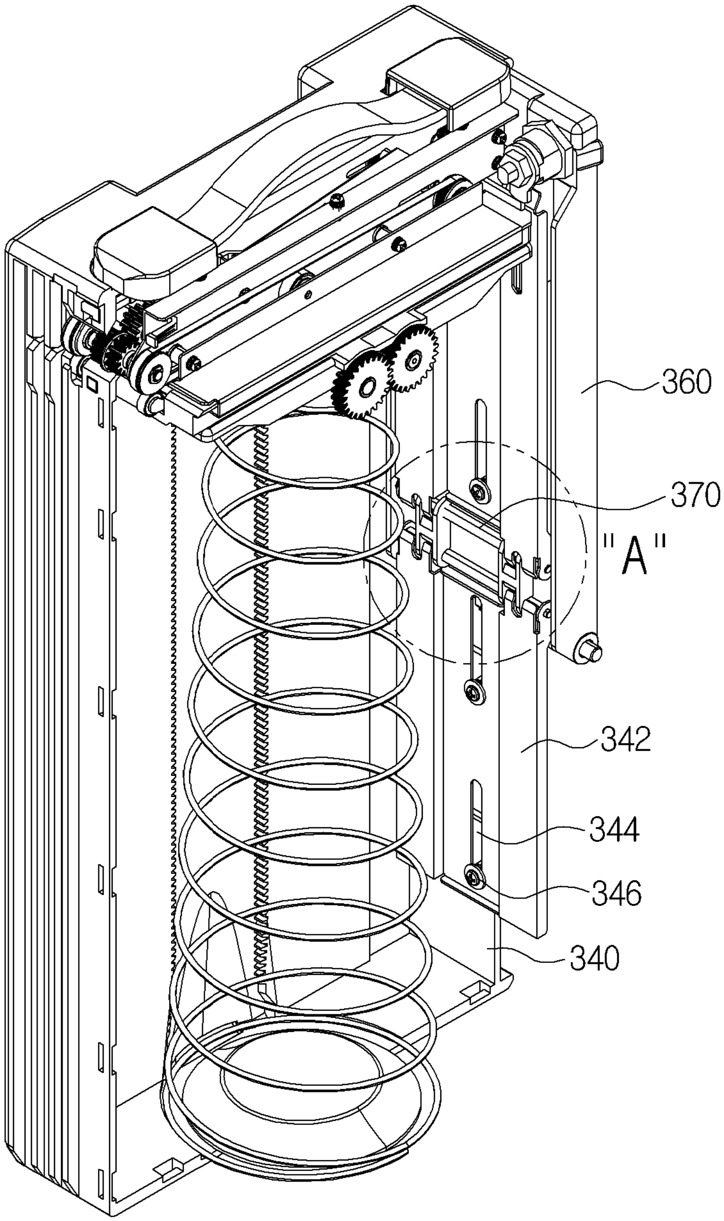
FIG. 12 is a perspective view showing a state where a portion of the cassette is cut away, while the cassette door is closed.

Further, as shown in FIGS. 11 and 12, the cassette door 360 as one of the characteristics of the present invention includes a door sliding plate 362 spaced apart from the inner surface thereof and slidingly moving up and down.

In this case, the cassette door 360 further includes sliding limitation slots 364 formed on the door sliding plate 362 to limit the moving distance of the door sliding plate 362 and sliding plate restriction members 366 fitted to the sliding limitation slots 364 and fixed thereto.

Accordingly, the door sliding plate 362 can slide, while maintaining a given distance from the inner surface of the cassette door 360.

In this case, when the banknotes stack, one end of the banknotes comes into contact with the door sliding plate 362, and in this state, when the banknotes move down to stack, they can move down gently.

That is, when the banknotes move, if the door sliding plate 362 moves a little, the mobility of the banknotes is improved, so that the banknotes can easily move down.

In this case, the cassette door 360 has a plurality of ribs RIB spaced apart from one another and protruding from the inner surface thereof, and if the door sliding plate 362 is fitted to the ribs RIB and restricted by the sliding plate restriction members 366, the door sliding plate 362 is suppressed from swinging and performs gentle sliding more accurately.

The deposit machine according to the present invention is configured to allow the cassette door 360 to openably rotate with respect to the lower plate 340 around the rotation hinge HIN and to locate the door sliding plate 362 on the inner surface of the cassette door 360 to ensure good downward mobility of the banknotes. Such advantages are obtained from the new configuration of the present invention, which is not suggested in the conventional practices.

Further, the deposit machine according to the present invention is configured to extend the door sliding plate 362 to the lower plate 340 so that the lower plate 340 has the same effectiveness as the cassette door 360. To this end, the lower plate 340 includes a lower sliding plate 342 spaced apart from the inner surface thereof and slidingly moving up and down, sliding limitation slots 344 formed on the lower sliding plate 342 to limit the moving distance of the lower sliding plate 342, and sliding plate restriction members 346 fitted to the sliding limitation slots 344 and fixed thereto.

Moreover, the lower plate 340 includes a link member 370 adapted to allow the lower sliding plate 342 to interlock with the door sliding plate 362.

Figure 13:
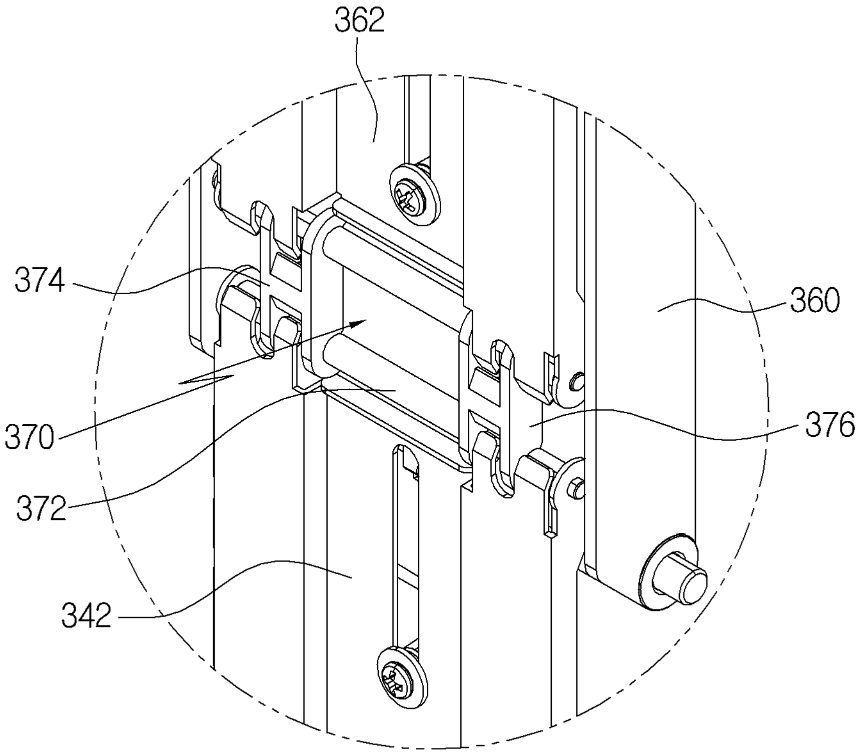
FIG. 13 is a perspective view showing a portion A of FIG. 12.

In this case, as shown in FIG. 13, the link member 370 includes a pair of link bars 372 disposed in parallel with each other and H-shaped first and second linkers 374 and 376 fixed to both ends of the pair of link bars 372.

Further, the lower end of the door sliding plate 362 is rotatably fixed to upper ends of the first and second linkers 374 and 376 by means of hinges.

To do this, both transverse ends of the lower end of the door sliding plate 362 extend downward.

Further, the top end of the lower sliding plate 342 is rotatably fixed to lower ends of the first and second linkers 374 and 376 by means of hinges.

To do this, both transverse ends of the upper end of the lower sliding plate 342 extend upward.

Under the above-mentioned configuration, when the cassette door 360 is folded to the outside, the door sliding plate 362 and the lower sliding plate 342 are folded to each other around the link member 370, so that the cassette door 360 can rotate to open, without any problem.

In addition, the door sliding plate 362 and the lower sliding plate 342 are connected to each other by means of the link member 370, so that they can move up and down together.

As described above, the deposit machine according to the present invention is configured to allow the header to be rotatable by means of the hinge, thereby providing easy maintenance, to have the large capacity cassette for handling 2,000 pieces of banknotes improved in configuration, thereby easily checking the banknote stack and internal state thereof, and to provide the image scanning function, thereby improving the counterfeit banknote detection capability, so that the deposit machine can improve the use conveniences thereof.

In specific, the deposit machine according to the present invention has the following advantages.

Firstly, the header is rotatable by means of the hinge, thereby providing easy maintenance for the deposit machine.

Secondly, all of the CIS, the MR sensor, and the IR sensor are adopted to perform the counterfeit banknote detection, thereby improving the counterfeit banknote detection effectiveness.

Thirdly, the plurality of prisms are adopted to easily and quickly check whether a banknote jam occurs, the cassette is mounted on or demounted from the body, and the gears are malfunctioned.

Lastly, the large capacity cassette for handling 2,000 or more pieces of banknotes is improved in configuration, thereby easily checking the banknote stack or the internal state thereof.

The present invention may be modified in various ways and may have several exemplary embodiments. Accordingly, it should be understood that the invention covers all the modifications, equivalents, and replacements within the idea and technical scope of the invention. Therefore, the present invention is not to be restricted by the embodiments as mentioned above. It is therefore intended that the scope of the invention be limited not by this detailed description, but rather by the claims appended hereto.

What is claimed is:

1. A deposit machine having a cassette with improved usability, comprising:
- a body;
- a header housing integrally fixed to one side of the body and comprising:
  - an infrared ray sensor and a magneto resistance sensor mounted thereon to detect whether banknotes are counterfeit banknotes and determine whether the banknotes are accommodated; and
  - a contact image sensor mounted thereon and a stepping motor as a driving source to transfer the banknotes inserted thereinto;
- a header cover openably and closably fixed to the header housing by a first hinge to allow top of the header housing to be open; and the cassette mounted inside the body to accommodate the banknotes supplied from the header housing and the cassette comprising:

a rectangular box-shaped cassette housing having a given space in which the banknotes are accommodated;

a handle fixed to top of the cassette housing;

banknote transfer gears disposed on one end portion of one longitudinal side thereof in a direction perpendicular to the handle;

a lower plate fixed to an opposite side to a surface on which the banknote transfer gears are disposed; and a cassette door fixed to the top end of the lower plate by a second hinge to open and close an open portion formed on the cassette housing.

2. The deposit machine of claim 1, wherein the cassette housing comprises at least one or more checking members, and said at least one or more checking members comprise a pair of first checking members formed of prisms to radiate a first radiated light and receive the first radiated light to detect whether a banknote jam occurs, a pair of second checking members formed of prisms to radiate a second radiated light and repeatedly receive or cut off the second radiated light to detect whether the banknote transfer gears are malfunctioning, and a pair of third checking members formed of prisms to radiate a third radiated light and receive the third radiated light to detect whether the cassette is mounted on or demounted from the body.

3. The deposit machine of claim 1, wherein the cassette door comprises:

a door sliding plate spaced apart from the inner surface thereof and slidingly moving up and down;

first sliding limitation slots formed on the door sliding plate to limit a moving distance of the door sliding plate; and first sliding plate restrictors fitted to the first sliding limitation slots and fixed thereto.

4. The deposit machine of claim 3, wherein the lower plate comprises:

a lower sliding plate spaced apart from the inner surface thereof and slidingly moving up and down;

second sliding limitation slots formed on the lower sliding plate to limit a moving distance of the lower sliding plate; and second sliding plate restrictors fitted to the second sliding limitation slots and fixed thereto.

5. The deposit machine of claim 4, wherein the lower sliding plate and the door sliding plate are connected to each other by a link member so that the lower sliding plate and the door sliding plate move together and are foldable to each other.

6. The deposit machine of claim 5, wherein the link member comprises:

a pair of link bars disposed in parallel with each other;

H-shaped first and second linkers fixed to both ends of the pair of link bars; and a lower end of the door sliding plate is rotatably fixed to upper ends of the first and second linkers by third hinges, while the top end of the lower sliding plate is being rotatably fixed to lower ends of the first and second linkers by fourth hinges.

* * * * *